United States Patent [19]

Surdyke

[11] Patent Number: 4,775,892
[45] Date of Patent: Oct. 4, 1988

[54] BRIGHTNESS-DEPENDENT FOCUSING AID FOR A MANUALLY FOCUSED VIDEO CAMERA

[75] Inventor: Keith R. Surdyke, Bergen, N.Y.

[73] Assignee: Eastman Kodak Company, Rochester, N.Y.

[21] Appl. No.: 138,785

[22] Filed: Dec. 28, 1987

[51] Int. Cl.[4] .......................... H04N 5/232; H04N 5/30
[52] U.S. Cl. ..................................... 358/227; 358/224; 354/409
[58] Field of Search .............. 358/227, 224, 221, 20 P, 358/168, 169, 170, 171, 172; 354/400, 409, 471

[56] References Cited

U.S. PATENT DOCUMENTS

| | | |
|---|---|---|
| 3,435,136 | 3/1969 | Bachmann . |
| 4,282,548 | 8/1981 | Plummer ............................ 358/227 |
| 4,317,135 | 2/1982 | Pitruzzello ........................ 358/227 |
| 4,392,726 | 7/1983 | Kimura ............................. 358/227 |
| 4,463,384 | 7/1984 | Fujikawa ........................... 358/227 |
| 4,481,540 | 11/1984 | Bergen ............................. 358/227 |
| 4,484,225 | 11/1984 | Bishop ............................. 358/227 |
| 4,583,123 | 4/1986 | Baier ................................ 358/227 |
| 4,586,090 | 4/1986 | Wilman ............................. 358/227 |
| 4,589,031 | 5/1986 | Tsuji ................................. 358/227 |
| 4,599,653 | 7/1986 | Kimura ............................. 358/224 |
| 4,660,092 | 4/1987 | Nutting ............................. 358/224 |

FOREIGN PATENT DOCUMENTS

52-369  1/1977  Japan .................................. 358/227

Primary Examiner—Tommy P. Chin
Attorney, Agent, or Firm—David M. Woods

[57] ABSTRACT

A focusing aid for a manually-focused video camera provides an indication of optimum focus by varying the video brightness according to the high frequency content of the video signal. The brightness variation is confined to a focusing slit occupying a small area of the display in an electronic viewfinder. A high frequency component is separated from the video signal and converted into a d.c. control signal having an amplitude that varies with frequency content. By injecting the d.c. control signal into the video signal during the period of the focusing slit, the video level is varied and a significant brightness shift is produced proportional to high frequency content. Optimum focus is obtained by adjusting the focus and bringing the video in the focusing slit to maximum brightness.

9 Claims, 7 Drawing Sheets

BRIGHTNESS-DEPENDENT FOCUSING AID FOR A MANUALLY FOCUSED VIDEO CAMERA

BACKGROUND OF THE INVENTION

1. Field of the Invention

This invention relates to a focusing arrangement for a video camera, and especially to an arrangement for aiding manual focusing through an electronic viewfinder. More specifically, the invention pertains to a signal processing circuit of the type that isolates a focus-related characteristic of a video signal and uses the isolated characteristic to visually modify the display of an image in the viewfinder.

2. Description Relative to the Prior Art

In a manually focused video camera, an electronic viewfinder is not only used to compose a scene as recorded by the camera but also to determine when the scene image is properly focused. As is the case with many optical systems, the proper focus is not a discrete distance but a range of distances through which the image is acceptably defined, i.e., a range indicated by the depth of field for a particular optical (lens) aperture and subject distance. An electronic viewfinder repeats images of the scene at the television frame rate, i.e., 1/30 second. This "exposure interval" dictates a particular lens aperture for the existing light condition and, therefore, establishes a particular depth of field for each subject distance. A special problem emerges when the viewfinder is used with a video still camera, which provides several exposure interval and aperture combinations for each light condition. The light condition that dictates a certain aperture . . . and thus a certain depth of field . . . for the electronic viewfinder may require an entirely different aperture for the still exposure (because the exposure interval may not be 1/30 second). Thus the depth of field for viewing may be an artificial indication of the actual picture-taking condition. The "real" depth of field may be considerably compressed from that observed in the viewfinder with the attendant possibility that a properly-focused viewfinder display may be unfocused with respect to the recorded picture.

If one could reliably locate the central focus position for the displayed depth of field, the picture would be in focus for any aperture (that is, for any depth of field). Owing, however, to the small size of the display screen in the viewfinder and the limited bandwidth available for the display, differences between details shown on the viewfinder screen are not very sharp or clear. Searching for optimum focus, necessary in view of the depth of field considerations heretofore mentioned, is a procedure marked by uncertainty.

U.S. Pat. No. 4,660,092 suggests one arrangement for dealing with such problems. A high frequency component of a luminance signal generated by a video camera is converted into a d.c. control signal having an amplitude that varies with high frequency content. By using the control signal to adjust the gain applied to the luminance signal in a central area of the viewfinder display, the contrast of the picture in the central area is accentuated according to the degree of focus.

In practice, the focusing arrangement in U.S. Pat. No. 4,660,092 has a noticeable shortcoming related to its particular application, that is, a contrast change in tiny display provided by the electronic viewfinder is insufficiently outstanding for focusing differences to be visually striking. To make the focusing differences as noticeable as possible, it is necessary to enlarge the central area affected by the changing contrast. Then, however, the central area begins to obscure and affect an undesirably large area of the scene--which burdens the principal use of the viewfinder, i.e., to frame the scene and select the right moment for the picture.

SUMMARY OF THE INVENTION

Unlike contrast, brightness shifts are more noticeable within the confines of an electronic viewfinder display. Indeed, large brightness shifts are clearly distinguishable even if a narrow slit is used instead of a windowed area in the viewfinder. Brightness shifts are related to focus according to the invention by generating a d.c. control signal from the high frequency content of the video signal. The signal processing circuit responds to this control signal by varying the d.c. level of the video signal generating the video display in the viewfinder. This variation, which is preferably limited to a small, off-center, slit-like region of the display raster, translates into a brightness shift proportional to high frequency video content, which in turn is proportional to the state of focus.

The invention can be further improved to make manual focusing even easier. Varying brightness around its proper, average scene value will suffice for purposes of the invention but will not ordinarily afford dramatic brightness shifts. However, setting "unfocused" brightness in the focusing slit near the black level and then increasing the d.c. level according to high frequency content will produce the desired dramatic shift. As the image comes into focus, the brightness in the focusing slit will "snap" rapidly from the black level to a bright white streak. Further advantage may be obtained by automatically controlling the gain of the video from which high frequency content is obtained so that brightness changes in the focusing slit are relatively uniform despite differences in image detail, particularly differences in image contrast.

BRIEF DESCRIPTION OF THE DRAWINGS

The invention will be described with reference to the drawings, wherein.

DESCRIPTION OF A PREFERRED EMBODIMENT

Figure 1:
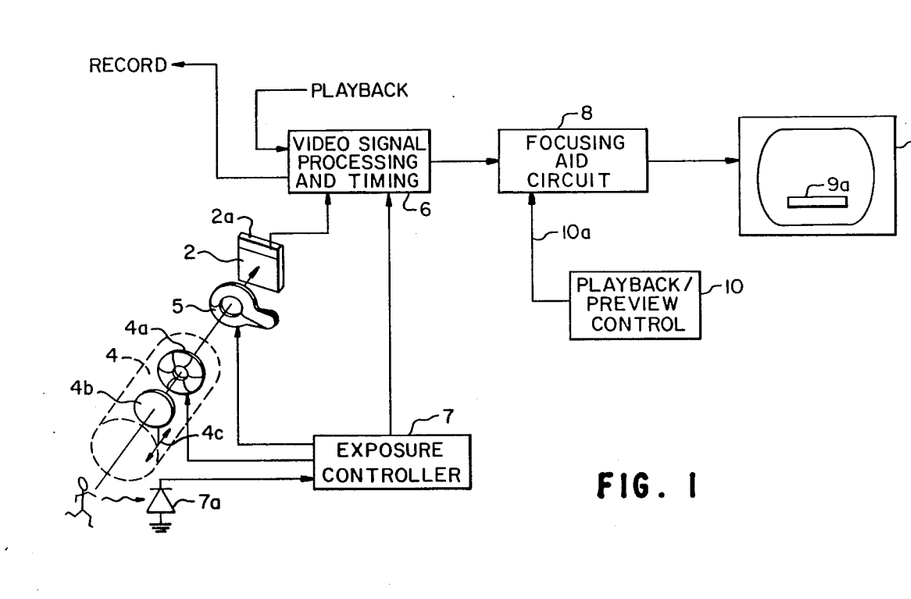
FIG. 1 is a diagram of pertinent portions of a video camera, including components that produce a brightness-dependent focusing aid in a viewfinder in accordance with the invention.

FIG. 1 identifies the basic elements of a video camera with special attention to a focusing aid of the type embodied by the invention. Other elements of the camera, either omitted or not shown in detail, may be readily selected from like elements known in the art. For example, the entire record and playback sections of the camera, which are unessential to an understanding of the invention, may be provided by ordinary components well known in this art. Moreover, although the focusing aid is disclosed in connection with a still video camera, the invention is not necessarily related to the mode of recording and, for example, could be similarly useful with a motion video camera.

Referring now to FIG. 1, a subject is imaged upon an image sensor 2 by an imaging assembly 4. Within the assembly 4 is a diaphragm 4a for controlling the optical aperture of the assembly, i.e., for determining the amount of imaging light to reach the sensor 2. Also included in the assembly 4 is a lens system 4b that is manually movable according to an arrow 4c in order to focus an image of the subject upon the sensor 2. (The imaging assembly 4 is typically a barrel-like structure having a knurled exterior ring connected by conventional gearing to the lens system 4b for adjusting the focus setting.) A light shutter 5 is interposed between the imaging assembly 4 and the sensor 2 for controlling the exposure interval. The sensor 2 is, for example, an interline transfer sensor having a horizontal register 2a from which a video signal is removed line-by-line in a known manner.

The video signal obtained from the sensor 2 is applied to a video signal processing and timing circuit 6, which includes the necessary matrices and circuits for generating luminance and color difference signals corresponding to the image. The level of exposure is controlled by an exposure controller 7, which receives light information from an exposure diode 7a and uses that information to control the diaphragm 4a and the shutter 5. Both luminance and color difference signals are directed to the record section, which is not further described. Alternatively, a playback signal conventionally reproduced from a recording medium (not shown) may be applied to the processing and timing circuit 6.

The luminance signal originating with either the sensor 2 or the playback circuit (not shown) is channelled through a focusing aid circuit 8 to a monochrome electronic viewfinder 9. A playback/preview control circuit 10 provides a select signal on a line 10a to activate the focusing aid circuit 8 when the viewfinder is previewing an image from the sensor 2. At other times, i.e., during playback of a previously recorded picture, the focusing aid circuit 8 is inactive and the video signal passes through without modification. In accordance with the invention, the brightness of a window 9a of the viewfinder display is varied according to the magnitude of high frequency information in the video signal. Preferably the window 9a is a narrow slit including, for example, ten video lines. Since high frequency information will peak when the image upon the sensor 2 is sharply defined, the degree of brightness in the slit 9a thus becomes a measure of the accuracy of manual focusing of the imaging assembly 4.

Figure 2:
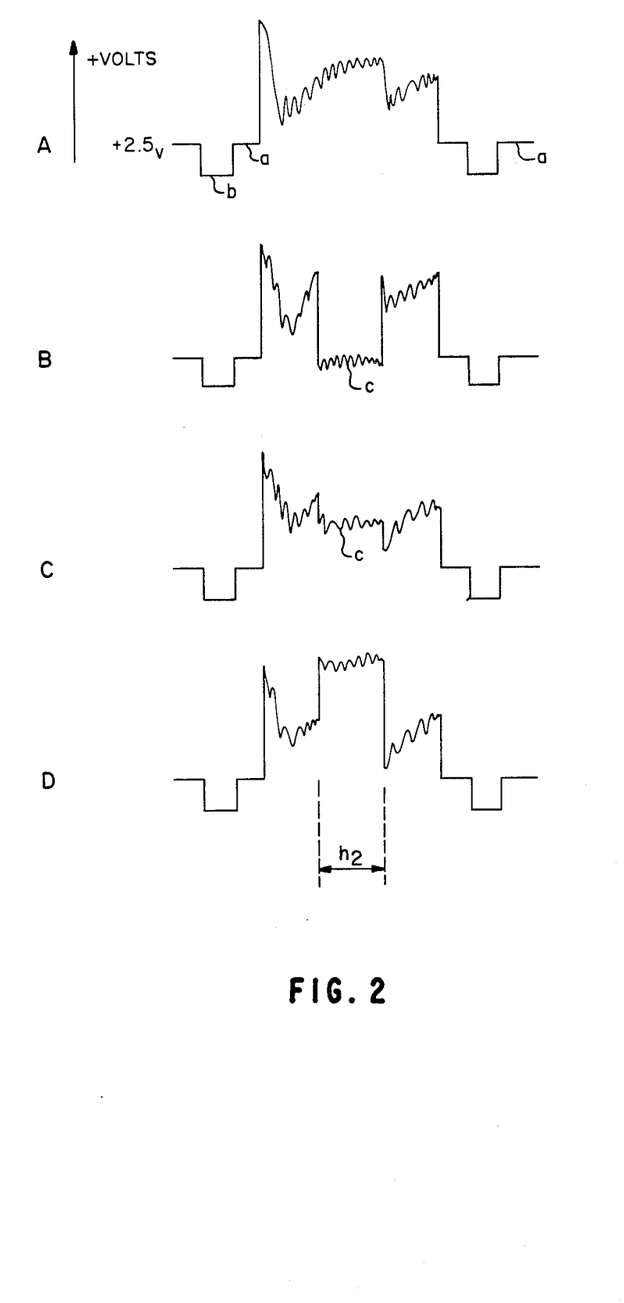
FIG. 2 is a series of waveforms showing the effect of injecting a brightness-related control signal into a video signal according to the invention.

As will be shown in detail in connection with subsequent figures, the focusing aid circuit 8 generates a positive d.c. control voltage having a magnitude corresponding to high frequency content. In particular, the greater the high frequency content, the higher (more positive) the control voltage. This is then added, as shown in the waveforms of FIG. 2, to the video signal. The waveform in FIG. 2A represents an unmodified line of the video signal. The back porch region "a" of the horizontal blanking interval is shown clamped to 2.5 volts d.c. (the tips "b" of the synchronization signal are also shown in FIG. 2A). Without any sign of high frequency content, a control voltage of 2.55 volts d.c. is added to each line of video during the occurrence of the focusing slit 9a, which preferably includes about ten lines of video. This produces a dark band "c" in each line of the video signal in the focusing slit, as shown by the waveform of FIG. 2B for a single line. As the image is focused the positive control voltage is increased and the band "c" becomes brighter (as shown in FIG. 2C). When high frequency content is at a maximum, the control voltage is sufficiently positive so that the band "c" has become essentially a bright streak in the focusing slit 9a (as shown by FIG. 2D).

Figure 3:
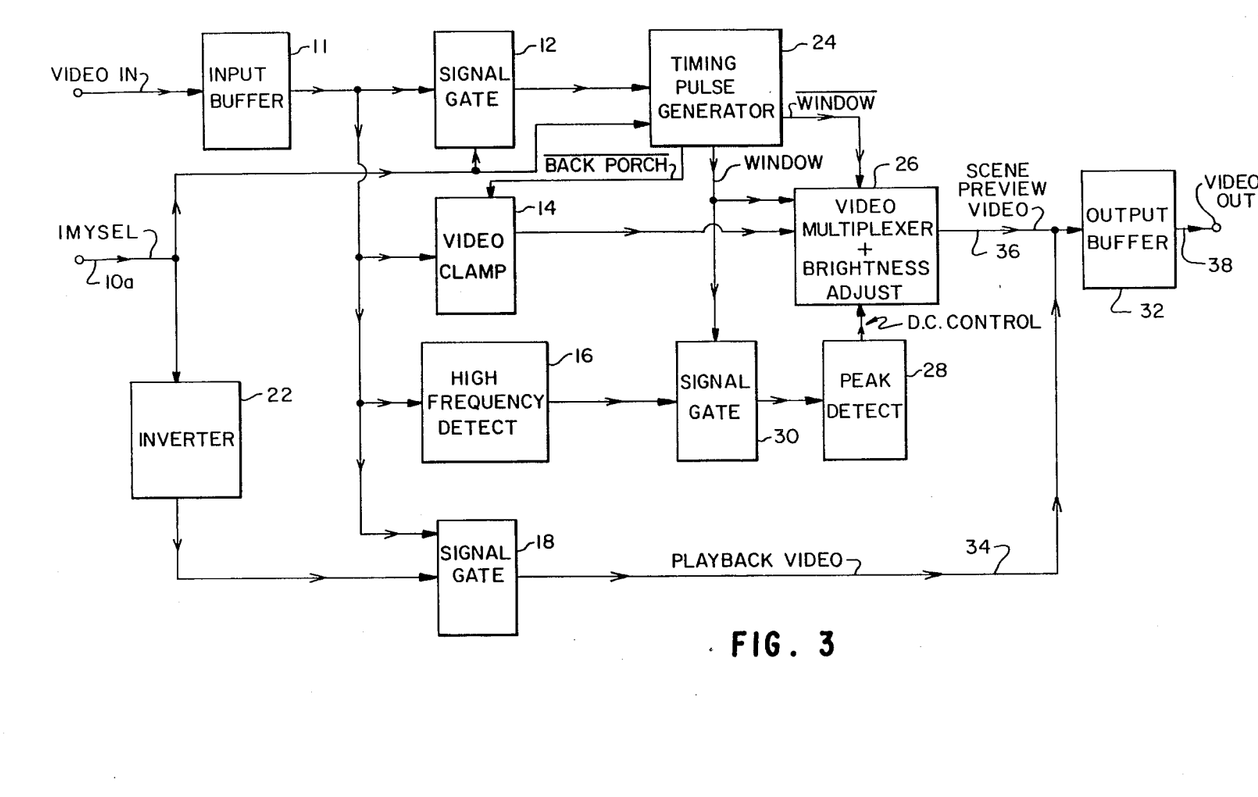
FIG. 3 is a block diagram of the focusing aid components of FIG. 1.
Figure 4:
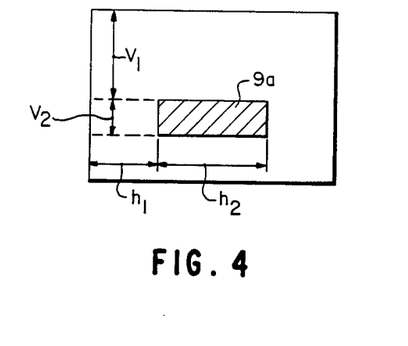
FIG. 4 is a raster diagram of the viewfinder display showing the focusing slit and pertinent time-related scanning dimensions.

A block diagram of the focusing aid circuit 8 is shown in FIG. 3. A video signal (from either the sensor or the playback circuit) is applied to an input buffer 11 of the focusing aid circuit 9 and thereafter distributed to a timing signal gate 12, a video clamping circuit 14, a high frequency detector 16 and a playback signal gate 18. The gate 12 connects to a timing pulse generator 24, which generates the timing signals WINDOW, $\overline{\text{WINDOW}}$ and $\overline{\text{BACKPORCH}}$ The high frequency detector 16 provides a high frequency component of the video signal through a high frequency gate 30 to a peak detector 28, which generates the aforementioned d.c. control signal. The video clamp 14 clamps the d.c. black level of the incoming video signal to 2.5 volts. The clamped signal is applied to a video multiplexer and brightness adjust circuit 26, which injects the d.c. control signal from the peak detector 28 into the clamped video during the period of the focusing slit 9a. The injected control voltage produces a brightness shift proportional to the high frequency content. As shown in FIG. 4, the slit 9a is offset vertically in the raster by a distance $v_1$ and horizontally by a distance $h_1$. The actual location of the window area 9a is controlled by the conditions of the timing signals WINDOW and $\overline{\text{WINDOW}}$ from the timing pulse generator 24. Specifically, WINDOW is high (and $\overline{\text{WINDOW}}$ is low) during the period corresponding to a vertical transition $v_2$ and a horizontal transition $h_2$ that define the extremities of the slit 9a. The operation of the clamp 14 and the condition of the high frequency gate 30 are also controlled by the timing signals BACK PORCH and WINDOW, respectively, from the timing pulse generator 24.

The circuit shown by FIG. 3 passes either playback video through the gate 18 (onto a line 34) or scene preview video through the circuit 26 (onto a line 36) to an output buffer 32 and therefrom to the electronic viewfinder 9 (see FIG. 1). The gates 12 and 18 are activated to select either a playback or preview video signal according to the condition of the select signal IMYSEL (imager luma select) provided to the focusing aid circuit on the line 10a from the playback/preview control circuit 10 (FIG. 1). When the select signal IMYSEL is high, the viewfinder is being used to preview and focus a scene prior to making a recording (preview mode); when low the viewfinder is displaying a previously recorded picture (playback mode). The select signal is routed along two paths, one directly applied to the gate 12 and the timing pulse generator 24 and the other inverted by an inverter 22 before application to the gate 18. The conditions of the gates 12 and 18 are thus mutually opposed; that is, when one is conductive the other is non-conductive, and vice versa. In the scene preview mode, the gate 12 passes preview video to the timing pulse generator 24, thereby activating the focusing aid circuit 8, while the gate 18 behaves like an open switch. In the playback mode, the gate 18 passes playback video to the output buffer 32 while the gate 12 behaves like an open switch, preventing playback video from reaching the timing pulse generator 24.

Figure 5:
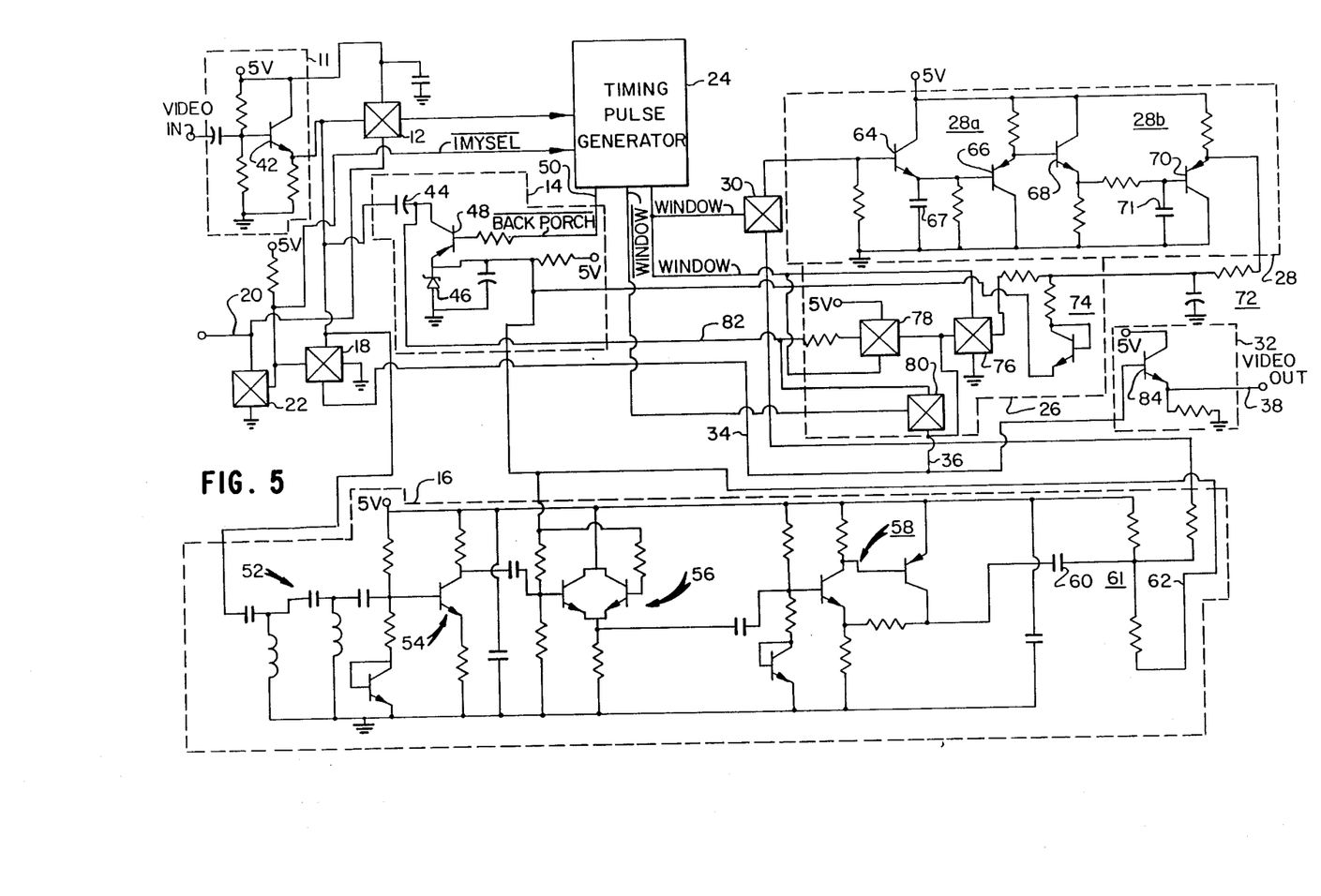
FIG. 5 is a detailed circuit diagram of the focusing aid diagram of FIG. 3.

Further circuit details of the focusing circuit block diagram of FIG. 3 are shown in FIG. 5. The same-numbered reference characters refer to the same components as referenced heretofore, including some components in broken line that include the further circuit details. The video signal is coupled into the input buffer 11, which includes a transistor 42 biased in an emitter-follower configuration and coupled through its output to the components described in connection with FIG. 3. In particular, the output of the transistor 42 is a.c. coupled through a capacitor 44 in the clamp 14 to the video multiplexer and brightness adjust circuit 26. The voltage level on the output side of the capacitor 44 is clamped to approximately 2.5 volt d.c. by a 2.5 volt reference diode 46 connected into the emitter circuit of a transistor 48. The base of the transistor 48 receives the timing control signal $\overline{\text{BACK PORCH}}$ on a line 50 from the timing pulse generator 24. When $\overline{\text{BACK PORCH}}$ is low, the transistor 48 conducts and the video is accordingly clamped to 2.5 volts d.c.

The output of the transistor 42 is further applied to a five-pole highpass filter 52 in the high frequency detection circuit 16. The output from the filter 52 is amplified by an amplifier stage 54 and applied to a clipping circuit 56. In order to reduce the effect of noise upon focusing information, the clipping level is set according to the signal-to-noise ratio of the camera and the gain of the preceding amplifier stage 54 so as to pass only the positive peaks due to high frequency content. The clipper output is then passed through an additional amplifier stage 58 and a.c.-coupled through a capacitor 60 to the high frequency gate 30. The output side of the capacitor 60 is clamped to a voltage slightly higher than the black level clamping voltage (e.g., 2.55 volts d.c.). This ensures that with no focusing information (high frequency content) available, the brightness level of the window area 40 will always be close to the black level voltage. This clamping voltage is provided by a voltage divider 61 connected between a 5 volt d.c. supply and a 2.5 volt d.c. reference on a line 62 coming from the video clamp 14.

The pulsations representative of high frequency content are passed through the high frequency gate 30 (when WINDOW is high) to the peak detector circuit 28, which is arranged in two stages 28a and 28b with four transistors 64, 66, 68 and 70 in complementary polarity for temperature compensation. The first stage includes transistors 64 and 66 and a capacitor 67 for registering a quick charge accumulation from the signal spikes representing high frequency content, while the second stage includes transistors 68 and 70 and a capacitor 71 for holding the charge over a longer period. The d.c. control signal formed across the capacitor 71 has an amplitude that varies according to the magnitude of high frequency content. The d.c. control signal is filtered in a ripple filter 72 and applied to a break-point amplifier 74 in the video multiplexer and brightness adjust circuit 26. This amplifier establishes two gain levels dependent upon input voltage so that a high d.c. control voltage (focused image) does not exceed recommended brightness levels for the viewfinder display.

The amplified d.c. control signal is injected into the focusing slit 9a by operation of three gates 76, 78 and 80. When the timing signal $\overline{\text{WINDOW}}$ is low (and WINDOW is high), the clamped video incoming on a line 82 passes through the gate 78, joins with the d.c. control signal passing through the gate 76 and exits the circuit 26 on the line 36 (the gate 80 is non-conductive during this time). When the opposite timing conditions prevail, the scene preview video passes through the gate 80 (both gates 76 and 78 being non-conductive at this time). The scene preview video, whether modified for high frequency content or not, is then passed directly to the output buffer 32, which includes a transistor 84 connected in emitter-follower configuration, and therefrom through the video output terminal 38 to the viewfinder 9 (FIG. 1).

In the playback mode, the select signal IMYSEL is low ($\overline{\text{IMYSEL}}$ is high). The gate 12 is thus non-conductive while the gate 18 is conductive. The playback video signal passes through the gate 18 directly to the output buffer 32 along the connecting line 34. Thus the aforementioned brightness modification in the brightness adjust circuit 26 is bypassed and no focusing slit appears in the display raster in the viewfinder 9.

Figure 6:
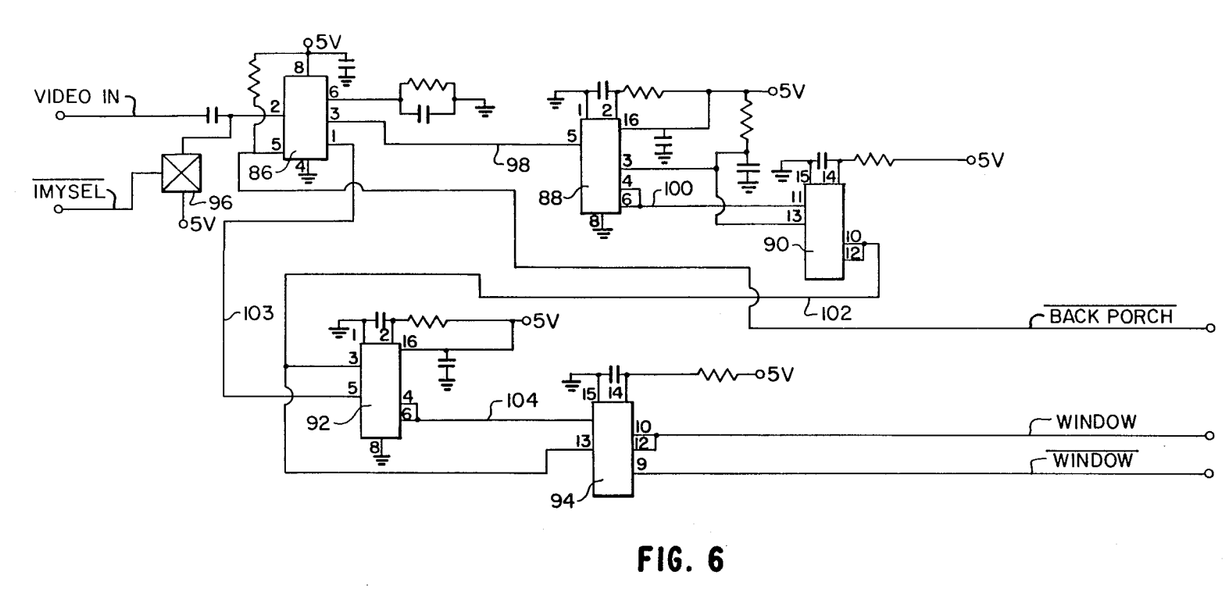
FIG. 6 is a circuit diagram of the timing pulse generator shown in FIG. 5.
Figure 7:
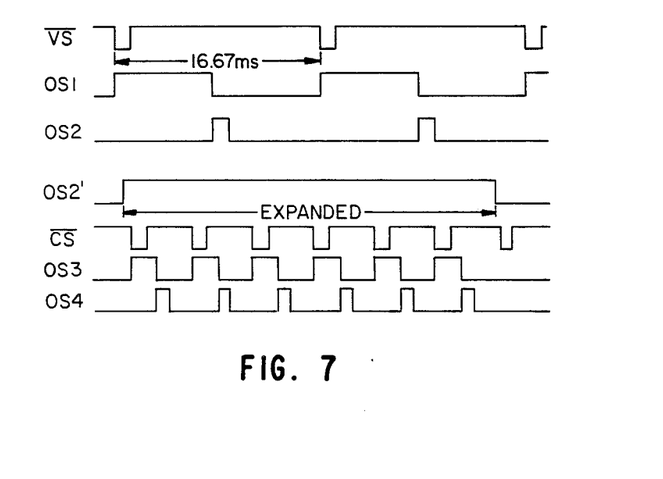
FIG. 7 is a chart of timing waveforms produced by the timing pulse generator of FIG. 6.

The timing pulse generator 24 is shown in further circuit detail in FIG. 6, together with waveforms of timing signals in FIG. 7. The circuit includes a sync separator 86 and four monostable multivibrators (one-shots) 88, 90, 92 and 94. Though specific parts are not required, the sync separator pin-outs are for a LM 1881 chip and the multivibrator pin-outs are for each half of a 74HC4538 dual one-shot. The video is brought into the sync separator 86 only when the gate 12 (see FIGS. 3 and 5) is conductive, that is, when the control signal IMYSEL is high and the scene is being previewed by the user. Conversely, during playback (when $\overline{\text{IMYSEL}}$ is high) the gate 96 becomes conductive and forces the input line of the sync separator 86 to 5 volts d.c. This deactivates the separator 86 and prevents oscillations in its output.

When activated, the sync separator 86 produces vertical sync $\overline{\text{VS}}$, composite sync $\overline{\text{CS}}$ and the $\overline{\text{BACK PORCH}}$ signals. During scene preview, the vertical sync signal $\overline{\text{VS}}$ is generated by the sync separator 86 on a line 98 and applied to the first one-shot 88, which generates a waveform OS1 (FIG. 7) that remains high for a period corresponding to the vertical transition $v_1$ in FIG. 4. The waveform OS1 is applied on a line 100 to the one-shot 90, which in turn generates a waveform OS2 (FIG. 7) that is connected by a line 102 to both one-shots 92 and 94. The waveform OS2 remains high during the vertical interval $v_2$ as shown in FIG. 4. (A single pulse of the waveform OS2 is shown expanded into the waveform OS2' in FIG. 7, during which the subsequent one-shot waveforms occur.) During the time that OS2 is high, both one-shots 92 and 94 are enabled. Meanwhile the sync separator 86 has been producing the composite sync signal $\overline{\text{CS}}$ on the line 103, which connects to the one-shot 92. (Although fewer pulses are shown for sake of brevity, preferably the waveform OS2 spans approximately ten composite sync pulses, that is, ten lines of video.)

Upon the occurrence of the first composite signal $\overline{CS}$ after the one-shot 92 has been enabled, the waveform 0S3 is produced by the one-shot 92 and applied on a line 104 to the input of the one-shot 94. The waveform 0S3 corresponds to the horizontal transition $h_1$ in FIG. 4. The falling edge of the waveform 0S3 triggers the waveform 0S4 at the output of the one-shot 94, which corresponds to the horizontal transition $h_2$ in FIG. 4. The waveform 0S4, and its complement, form the timing signals WINDOW and $\overline{WINDOW}$, respectively, that define the focusing slit area 9a in which the brightness adjustment is obtained.

Figure 8:
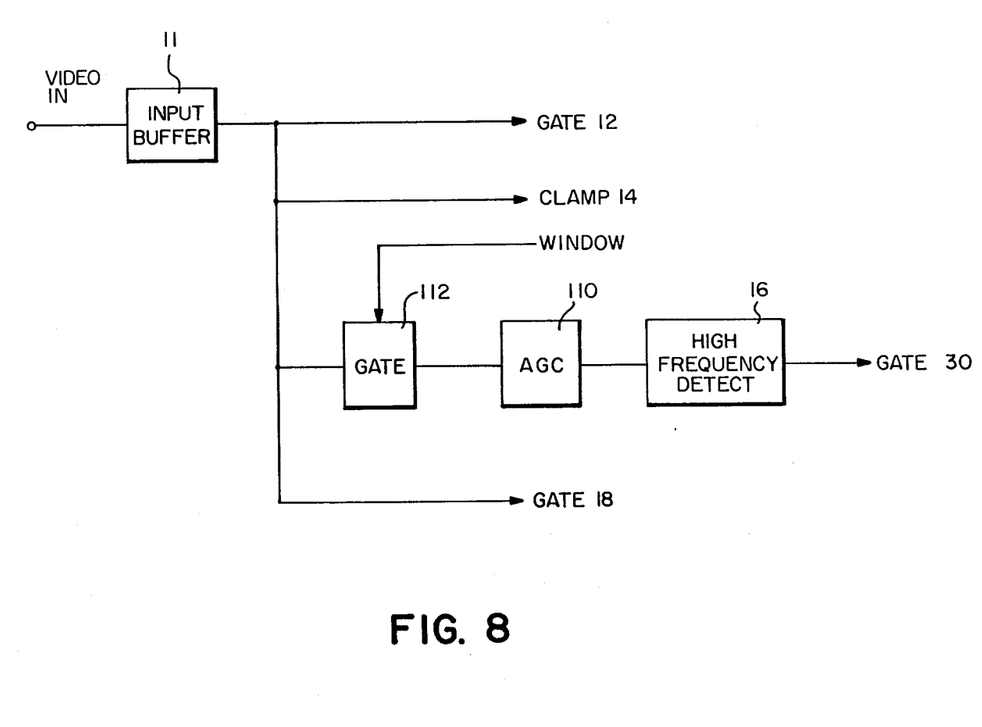
FIG. 8 is a modification of the circuit of FIG. 3 showing the addition of an automatic gain control circuit.

The focusing aid depends on an image level transition that can be detected as the imager is scanned. Since scanning is ordinarily done horizontally relative to the image, this means that the image should contain some sort of generally vertical transition for high frequency content to be detected. It is also of interest that the response of the focusing aid is proportional to the contrast change present in the subject, that is, the greater the change in contrast, the greater the change in brightness level in the focusing slit as optimum focus is achieved. Since this effect is related less to optimum focus than to image contrast, it may be desirable to normalize the signal level applied to the high pass filter 52 so that its output is due to high frequency content alone and the brightness in the slit region will respond to high frequencies independent of contrast. FIG. 8 shows a modification to the circuit of FIG. 3 in which an automatic gain control circuit 110 is included before the high frequency detection circuit 16 in order to automatically control the gain of the video from which the high frequency content is obtained. Since it is necessary to confine gain control to the slit region 9a, the incoming video signal is gated to the gain control circuit 110 when a gate 112 is rendered conductive by the signal WINDOW from the timing pulse generator 24.

Further, as would be expected, the smaller the focal length of the lens used, the greater the depth of field and the less discriminating is the brightness-related focusing indication, that is, the broad in-focus range of distances corresponds to a substantial focus adjustment that produces little brightness change in the focusing slit (always bright). Thus the focusing aid works most effectively at larger focal lengths where depth of field is smaller and optimum focus is associated with a narrow range of distances.

The invention has been described in detail with particular reference to a presently preferred embodiment, but it will be understood that variations and modifications can be effected within the spirit and scope of the invention.

What is claimed is:

1. In video apparatus of the type that isolates the high frequency content of a video signal and uses the high frequency content to modify a video display generated within an electronic viewfinder in order to indicate a properly focused video image, the improvement wherein said video apparatus comprises:
   means for generating a control signal that varies according to the high frequency content of the video signal as the video image is brought into focus; and
   means responsive to variations in the control signal for correspondingly varying the d.c. level of the video signal generating the display in the viewfinder whereby the brightness level in the viewfinder corresponds to the high frequency content of the video signal.

2. The apparatus as claimed in claim 1 in which said means responsive to variations in the control signal for varying the d.c. level of the video signal is operative during a portion of the display.

3. The apparatus as claimed in claim 2 in which the portion of the display in which the d.c. level is varied corresponds to a slit-like region of approximately ten video lines.

4. The apparatus as claimed in claim 1 in which said means responsive to the control signal for varying the d.c. level of the video signal obtains such variation by combining the control signal and the video signal within a video line during at least a portion thereof.

5. The apparatus as claimed in claim 4 in which the control signal is biased near the black level of the video signal in the absence of high frequency content so that an unfocused image is represented by a black portion of the line scan.

6. The apparatus as claimed in claim 5 in which the d.c. level of the video signal is brought toward a white level in the presence of high frequency content.

7. In a manually-focused video camera having a signal processing circuit of the type that isolates a high frequency component of a video signal and uses the isolated high frequency component to modify the video display in an electronic viewfinder, the improvement wherein the signal processing circuit comprises:
   means responsive to the high frequency component for generating a focus-related signal from the video signal;
   means for generating a d.c. control voltage representing the peak amplitude of the focus-related signal;
   means for clamping the black level of the video signal to a predetermined d.c. voltage;
   means for generating a timing signal for defining a selected area of the video display; and
   means responsive to said timing signal for injecting said d.c. control voltage into said clamped video signal thereby producing a brightness shift in the display video level proportional to the high frequency component present in the video signal.

8. The apparatus as claimed in claim 7 in which said focus-related signal generating means comprises:
   a high pass filter for separating said of the video signal;
   a clipping circuit for removing low amplitude noise from the high frequency component; and
   a voltage clamper for clamping the base level of the clipped signal to the approximate black level of the video signal.

9. The apparatus as claimed in claim 7 in which said means for generating a d.c. control voltage comprises:
   a first peak detector for quickly responding to rapid peak amplitude changes in the focus-related signal; and
   a second peak detector connected to said first peak detector for holding the peak amplitude change over a relatively longer period.

* * * * *

UNITED STATES PATENT OFFICE
CERTIFICATE OF CORRECTION

PATENT NO. : 4,775,892

DATED : October 4, 1988

INVENTOR(S) : Keith R. Surdyke

It is certified that error appears in the above-identified patent and that said Letters Patent are hereby corrected as shown below:

Column 8, line 49, after "said" insert --high frequency component--.

Signed and Sealed this

Twenty-eighth Day of March, 1989

Attest:

DONALD J. QUIGG

Attesting Officer

Commissioner of Patents and Trademarks